USO10027533B2

(12) United States Patent
Meagher et al.

(10) Patent No.: US 10,027,533 B2
(45) Date of Patent: Jul. 17, 2018

(54) SYSTEM FOR CLOUD-BASED SERVICE OUTAGE DETECTION AND VERIFICATION

(71) Applicants: Catherine F. Meagher, West Hartford, CT (US); Barkley Scott Harris, Prospect, CT (US)

(72) Inventors: Catherine F. Meagher, West Hartford, CT (US); Barkley Scott Harris, Prospect, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 137 days.

(21) Appl. No.: 15/251,799

(22) Filed: Aug. 30, 2016

(65) Prior Publication Data

US 2018/0062915 A1 Mar. 1, 2018

(51) Int. Cl.
    G06F 15/173 (2006.01)
    H04L 12/24 (2006.01)
    H04L 29/08 (2006.01)
    H04L 12/26 (2006.01)

(52) U.S. Cl.
    CPC ........ H04L 41/0686 (2013.01); H04L 41/069 (2013.01); H04L 43/0823 (2013.01); H04L 67/02 (2013.01); H04L 67/10 (2013.01)

(58) Field of Classification Search
    USPC ....... 709/203, 206, 217, 219, 223, 224, 226, 709/228, 231, 232, 238; 714/4.11; 726/26; 1/1
    See application file for complete search history.

(56) References Cited

U.S. PATENT DOCUMENTS

| 8,589,190 B1 | 11/2013 | Pugh et al. |
|---|---|---|
| 2008/0033768 A1 | 2/2008 | Hisano |
| 2012/0072242 A1 | 3/2012 | Fiori et al. |
| 2012/0203577 A1 | 8/2012 | Faupel et al. |
| 2013/0013344 A1 | 1/2013 | Ernstberger et al. |
| 2013/0332204 A1 | 12/2013 | Fiori et al. |

(Continued)

Primary Examiner — Quang N Nguyen
(74) Attorney, Agent, or Firm — Ference & Associates LLC (57) ABSTRACT

An embodiment provides a system for cloud-based service outage detection and verification, including: a network link that receives, over a data communications network, cloud service provider outage information according to a predetermined retrieval policy; a processor that generates, using text data derived from the cloud service provider outage information, outage data comprising a third party cloud service provider identification and an outage characteristic; and a database that stores the outage data indexed according to cloud service provider identification and outage characteristic; the processor receiving, over the data communications network, data of a requesting entity; the processor thereafter identifying that the requesting entity subscribes to a cloud-based service of the third party cloud service provider based on a query using the database; and in response to the processor determining that the requesting entity subscribes to a cloud-based service of the third party cloud service provider, confirming that the-cloud based service has experienced an outage based on the outage data stored in the database and providing a verification indication to the requesting entity. Other embodiments are described and claimed.

18 Claims, 7 Drawing Sheets

(56) References Cited

U.S. PATENT DOCUMENTS

| | | |
|---|---|---|
| 2014/0032249 A1 | 1/2014 | Kruglick |
| 2014/0074519 A1 | 3/2014 | Pugh et al. |
| 2015/0169419 A1* | 6/2015 | Carney .................. H04L 69/00 714/4.11 |
| 2016/0036670 A1* | 2/2016 | Sadovsky ........... H04L 43/0817 709/224 |
| 2016/0062816 A1* | 3/2016 | Ivanova ............... G06F 11/0772 726/26 |
| 2017/0374121 A1* | 12/2017 | Phillips ............... H04L 65/4069 |

* cited by examiner

SYSTEM FOR CLOUD-BASED SERVICE OUTAGE DETECTION AND VERIFICATION

FIELD

The subject matter describes computerized data processing systems and corresponding methods for the retrieval of records stored in a database or as computer files, particularly the subject matter relates to programs used to acquire content for indexing that employ filtering and categorizing techniques to remove unwanted content.

BACKGROUND

A cloud-based service is an on-demand hosted computer infrastructure or platform, including hosted computing services provided on an infrastructure as a service (IaaS) model, software as a service (SaaS) model, or platform as a service (PaaS) model. Cloud-based services are provided remotely using a network connection, e.g., the Internet.

Cloud-based services have taken on an important role in many businesses. Small and medium sized businesses, for example, are often reliant on cloud-based services for web hosting, transaction processing (e.g., credit card processing), communication (e.g., email services), and data storage. This is because these businesses typically do not have the resources in house to provide all of the necessary technology services required.

Businesses that operate using cloud-based services take on risk because a third party often hosts the cloud-based service and provides the cloud-based service to many clients. If a cloud-based service becomes unavailable (e.g., a cloud-based email service experiences an outage, data stored in the cloud becomes unavailable, etc.) this may negatively impact the operation of the business.

A conventional approach to dealing with an outage is to retain redundant services, whether through the same cloud service provider, a different cloud service provider, or via an in-house or alternate mechanism that provides an equivalent or alternate service. This provides some assurance that in the event of an outage the business will not be left without any options in terms of replacing the temporarily unavailable cloud-based service.

BRIEF SUMMARY

In summary, an embodiment provides a system for cloud-based service outage detection and verification, comprising: a network link that receives, over a data communications network, cloud service provider outage information according to a predetermined retrieval policy; a processor that generates, using text data derived from the cloud service provider outage information, outage data comprising a third party cloud service provider identification and an outage characteristic; and a database that stores the outage data indexed according to cloud service provider identification and outage characteristic; the processor receiving, over the data communications network, data of a requesting entity; the processor thereafter identifying that the requesting entity subscribes to a cloud-based service of the third party cloud service provider based on a query using the database; and in response to the processor determining that the requesting entity subscribes to a cloud-based service of the third party cloud service provider, confirming that the-cloud based service has experienced an outage based on the outage data stored in the database and providing a verification indication to the requesting entity.

An additional embodiment provides a method for cloud-based service outage detection and verification, comprising: receiving, over a data communications network, cloud service provider outage information according to a predetermined retrieval policy; generating, using a processor that extracts text data derived from the cloud service provider outage information, outage data comprising a third party cloud service provider identification and an outage characteristic; and storing, in a database, the outage data indexed according to cloud service provider identification and outage characteristic; receiving, over the data communications network, data of a requesting entity; thereafter identifying, using the processor, that the requesting entity subscribes to a cloud-based service of the third party cloud service provider based on a query using the database; and in response to the processor determining that the requesting entity subscribes to a cloud-based service of the third party cloud service provider, confirming that the-cloud based service has experienced an outage based on the outage data stored in the database and providing a verification indication to the requesting entity.

A further embodiment provides a system for cloud-based service outage detection and verification, comprising: a database that stores third party cloud service outage information; a system memory; and a processor that is operatively coupled to the database and the system memory; the processor being configured to receive data of a requesting entity, to identify the requesting entity based on a database query using the data of the requesting entity, and to determine that the requesting entity is associated with an agreement for a cloud-base service of a third party; the processor being configured to execute a program of instructions to: automatically collect data from a plurality of predetermined sources; store the data in the database; and confirm that the cloud-based service has experienced an outage based on data stored in the database; the system further: evaluating, using the data stored in the database, that the outage meets at least one predetermined time limit specified in the agreement; and in response to the at least one predetermined threshold being met, provide a redress indication to the requesting entity.

Additional embodiments are described, including other methods, as well as devices/apparatuses, systems including multiple devices, and products.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates an example of a web browser extension for collecting cloud-based service monitoring data.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides a system that facilitates monitoring of a cloud-based service to detect outages. If an outage in the cloud-based service is detected, an embodiment determines one or more characteristics of the outage, e.g., automatically determines its duration, geographic distribution, impact on known products or services of the cloud-based service, etc. In the event of an outage, and given a characteristic, e.g., a duration determination for the outage, an embodiment automatically identifies an entity, e.g., a business entity relying on the cloud-based service, such that the unavailability of the cloud-based service is known and steps may be taken such that the outage minimally impacts the entity.

Embodiments represent a significant technical improvement that is more efficient and accurate than a manual collection and review of sources of cloud outage data. An embodiment is directed to substantially more than merely a computer implementation of a routine or conventional activity previously known in the industry as it significantly advances the technical efficiency, access and/or accuracy of obtaining, processing, modifying, storing and comparing data sources of cloud outages by implementing a specific new method and system, as defined herein.

An embodiment provides a specific advancement in the monitoring, detection, verification and review process for cloud-based service outages by providing technical benefits for automated data collection, importation, formatting, evaluation, and analysis. The embodiments provide improvement beyond a mere generic computer implementation as they involve the processing and conversion of significant amounts of data in a new beneficial manner, as well as the interaction of a variety of specialized insurance, client and/or vendor systems, networks and subsystems.

In an embodiment, redress may be provided, e.g., in the form predetermined to fit a business entity's needs. For example, a business entity may arrange for a particular redress of predetermined character to be provided automatically following a cloud-based service outage. By way of specific example, a business entity may negotiate redress in advance of an outage in the form of an offering of an alternative service, a payment, or like remedy to offset the impact of the cloud-based service outage.

In an embodiment, an outage of a cloud-based service is characterized, e.g., in terms of duration and/or the impact to a business entity that relies thereon. If the outage is confirmed and meets a predetermined characteristic or set of characteristics, e.g., exceeds a predetermined time duration such as 12 hours, an embodiment provides redress irrespective of cause of the outage.

An embodiment therefore provides a technical solution to the problem of identifying and verifying the existence of a cloud-service outage, linking of this cloud-service outage with a particular entity, and identifying any redress available for the particular entity. This technical solution is provided at least in part by a system that is capable of monitoring known data source(s) for outage information, automatically formatting the outage information into outage data that is indexed according to cloud service provider name/identifier and characteristic, e.g., duration of the outage, level of the outage, etc., and automatically associating the outage data with one or more entities known to rely on the cloud-based service experiencing an outage. As such, the various embodiments described herein streamline the process of identifying and verifying an outage, and consequently make it possible to offer redress to entities that rely on the cloud-based service.

The illustrated example embodiments will be best understood by reference to the figures. The following description is intended only by way of example, and simply illustrates certain example embodiments.

Figure 1:
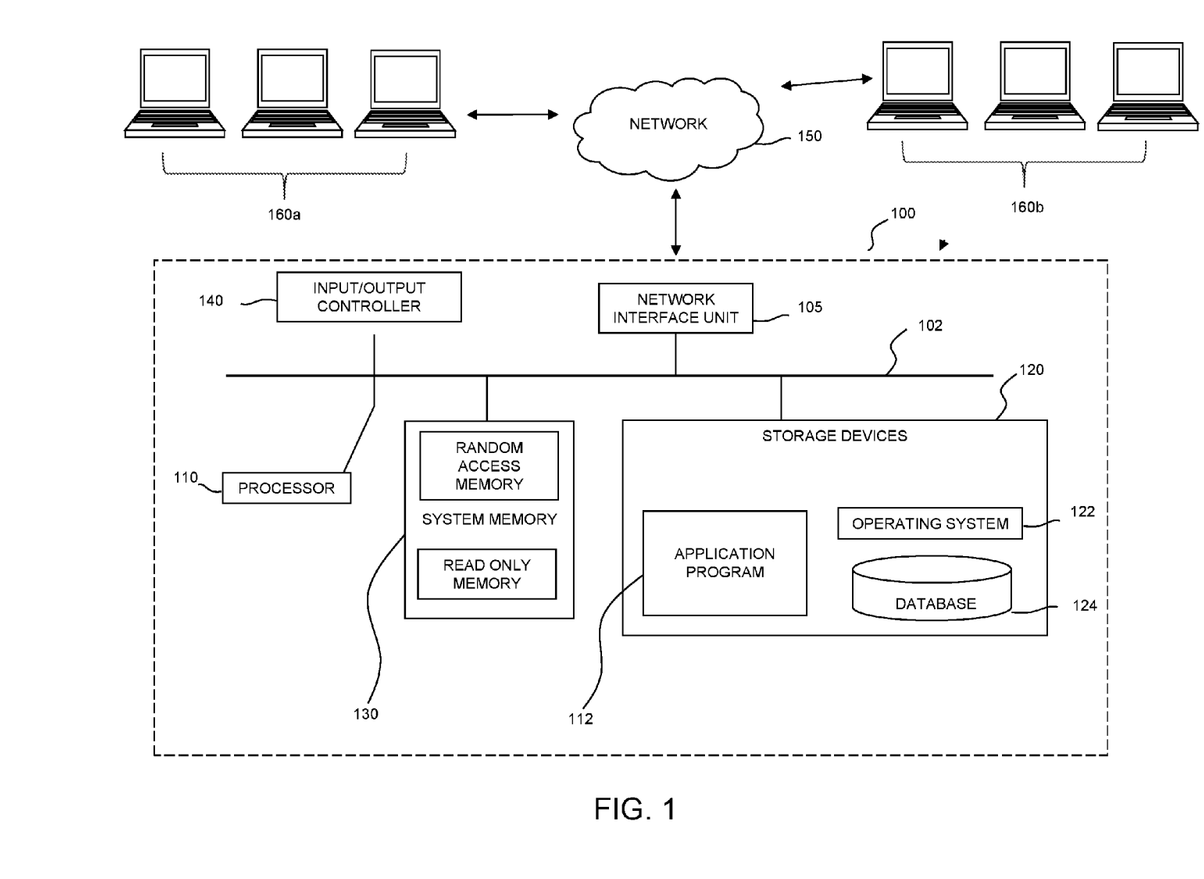
FIG. 1 illustrates an example distributed system for detecting and verifying a cloud-based service outage.

As illustrated in the non-limiting example of FIG. 1, a storage device 120 includes an application program 112 such as a cloud-based service monitoring program that may be run or executed by processor(s) 110 according to an operating system 122. The circuitry of system 100 provides that the processor(s) 110 loads the operating system 122 and thereafter the application program 112, e.g., into memory 130.

System 100 typically includes a network interface 105 facilitating communications with other devices 160a, 160b, e.g., a connection to other devices 160a, 160b, e.g., web servers that publish information regarding a cloud-based service, remote devices that offer the cloud-based service itself, information services that provide outage related information (e.g., power outage information), etc. The communication connection between system 100 and other devices 160a, 160b may take place over a network 150 using components such as a WWAN transceiver, a WLAN transceiver or a wired connection, e.g., a LAN connection.

Commonly, system 100 will include an input/output controller 140 for data input and display. System 100 typically includes various memory 130 and storage devices 120, for example a database 124, e.g., for storing data from internal and external data sources, referred to herein.

In an embodiment, a service monitors cloud-based service outages in an effort to identify and verify the characteristics of the outages. This in turn facilitates offering redress solutions to various entities that are reliant on the cloud-based services offered by third parties.

Figure 2:
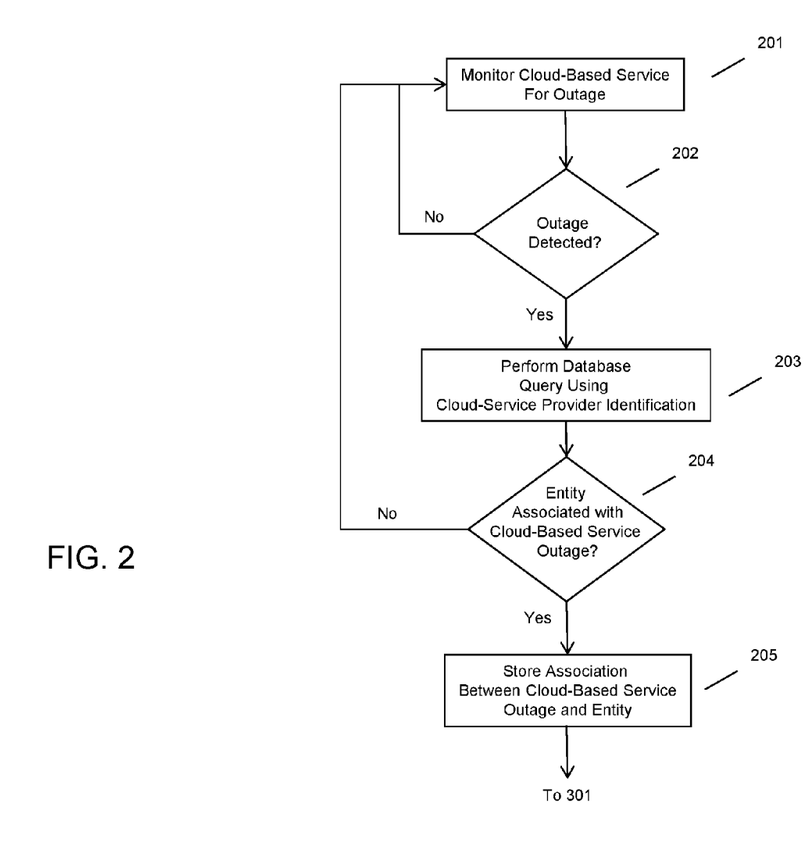
FIG. 2 illustrates an example method of detecting and verifying a cloud-based service outage.

For example, and referring to FIG. 2, an embodiment monitors a cloud-based service at 201. The monitoring at 201 may take a variety of forms. For example, the monitoring 201 may include collection and storage of data published on a website, such as a website of a cloud service provider, a website of a reporting service, etc. Alternatively, or in addition to the foregoing, the monitoring at 201 may include requesting confirmation of cloud-based service availability and/or requesting notification of cloud-based service unavailability from the cloud service provider. This permits the automated collection and analysis of outage data as part of the monitoring at 201. Further description is provided in connection with FIG. 5 and FIG. 6 regarding the types of data that may be collected and stored, as well as the type of analyses that may be applied thereto.

As illustrated in FIG. 2, if an outage is detected at 202, a database query is performed using the cloud-based service identification associated with the outage at 203. By way of example, if cloud service provider A indicates on a website associated with cloud service provider A that an outage has been experienced, this indicates that cloud service provider A has experienced an outage in one or more services offered. Depending on the amount of information available from the monitoring at 201, further details or characteristics might be available regarding the type or character of the outage without further data retrieval.

By way of example, the monitoring at 201 may collect data regarding the type of cloud-based service that is affected, e.g., cloud-based storage versus cloud-based transaction processing, etc. Thus, the cloud service provider identification used to perform the database query at 203 may comprise more than a simple identification of the cloud service provider. For example, the database query may be refined to include a specific service or set of services offered by cloud service provider A.

The result of the database query performed at 203 may include an indication that cloud service provider A is known to provide cloud-based services to one or more entities. Likewise, the result of the database query performed at 203 may include an indication that the cloud service provider A is known to provide specific cloud-based services to one or more entities. The data returned from the database query performed at 203 may be in the form of: Cloud_Based_Service_Provider: A; Cloud Based_Services: 1–n; Entity: 1–n.

As such, an embodiment may determine, e.g., according to a cloud-based service monitoring program 112 executed by system 100, that one or more entities are implicated in the outage, as illustrated at 204. By way of example, a cloud-based service monitoring program may include a functionality whereby an entity (e.g., Entity_B) is listed in a database as subscribing to a cloud-based service of cloud service provider A. Furthermore, an embodiment may determine that the cloud-based service of cloud service provider A is or has experienced an outage, i.e., is unavailable for use generally, unavailable for use in a specific geographic area, is unavailable for a specific purpose, etc.

Thus, an embodiment may determine at 204 that an entity is associated with the cloud-based service outage. This association may be stored at 205, as illustrated in FIG. 2. This association may be used in a process of indicating whether a relevant outage has been detected and/or offering an indication of redress availability for the entities affected by the outage.

Figure 3:
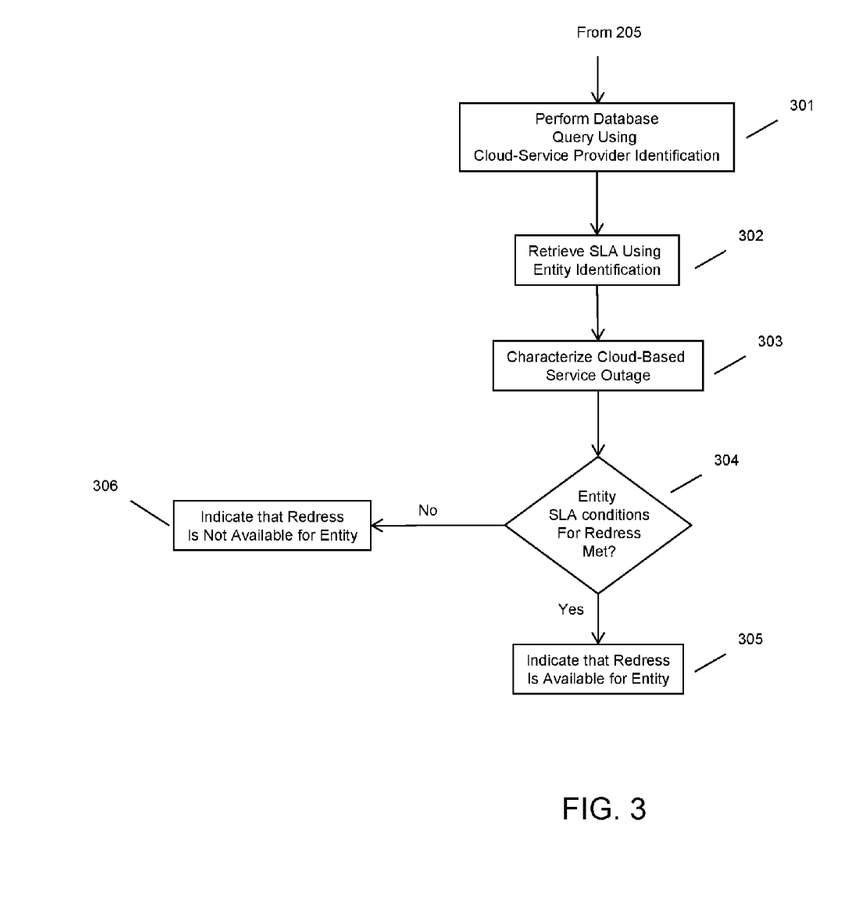
FIG. 3 illustrates an example method of determining redress is available for an entity based on a detected and characterized cloud-based service outage.

As a non-limiting example, having determined that one or more entities are affected by an outage detected as a result of monitoring at 201, as illustrated in FIG. 2, an embodiment may perform a database query using the cloud-service provider identification at 301, as illustrated in FIG. 3. This may again include use of the name or associated identification (e.g., number, alphanumeric code, etc.) of the cloud service provider.

The result of the database query at 301 may be a listing of or retrieval of service license agreement (SLA) data or other agreement data. The agreement data retrieved at 302 may comprise data indicating that an entity has subscribed to a cloud-based service of cloud service provider A and the terms thereof. Moreover, the agreement data may indicate that the entity in question has an agreement for redress offering(s), with the cloud service provider or another, independent party, and the terms on which redress will be offered in the event of an outage. For example, agreement data may include data establishing an insurance agreement between an entity and an insurer for coverage in the event of a cloud-based service outage. These terms may be considered as predefined characteristic(s) of the outage, e.g., type, duration, etc., that must be present for redress to be available to the entity.

An embodiment therefore characterizes the cloud-based service outage at 303. For example, an embodiment may utilize the data collected via monitoring at 201 in an effort to determine if one or more relevant agreement requirements or characteristics have been violated, making an entity eligible for redress services.

If one or more conditions for redress have been met, as determined at 304, an embodiment may provide an indication that the entity is eligible for redress at 305. Otherwise, an entity may not be eligible for redress, as indicated at 306. For example, if a cloud-based service outage is detected, but the outage is less than a predetermined duration (e.g., 12 hours), then an entity may not be entitled to redress per the agreement data, as indicated at 306. In contrast, if an outage is detected and the outage is greater than a predetermined duration (e.g., 12 hours), then an entity may be entitled to redress per the agreement data, as indicated at 305.

In one embodiment, an automated monitoring program is provided as a solution to provide timely and accurate identification of a cloud-based service outage, as well as providing a mechanism for validating or verifying that the outage is of a type or character that qualifies an entity for redress. In an embodiment, this is implemented in part by automated data collection from third party sources.

Figure 4A:
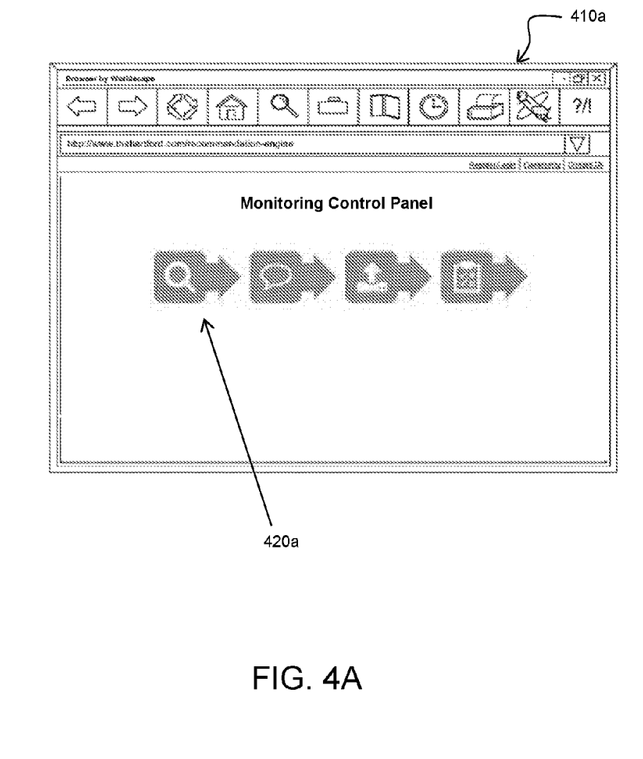

For example, and referring to FIG. 4(A-B), an embodiment may monitor web site content for changes using known uniform resource locators (URLs) of websites that offer source data regarding cloud-based service outages. As illustrated in FIG. 4A, a web browser application 410a may be implemented with an extension that offers additional functionality in terms of automatically monitoring web content. The extension may be accessed by interfacing with a settings element 420a provided in the web browser application.

Figure 4B:
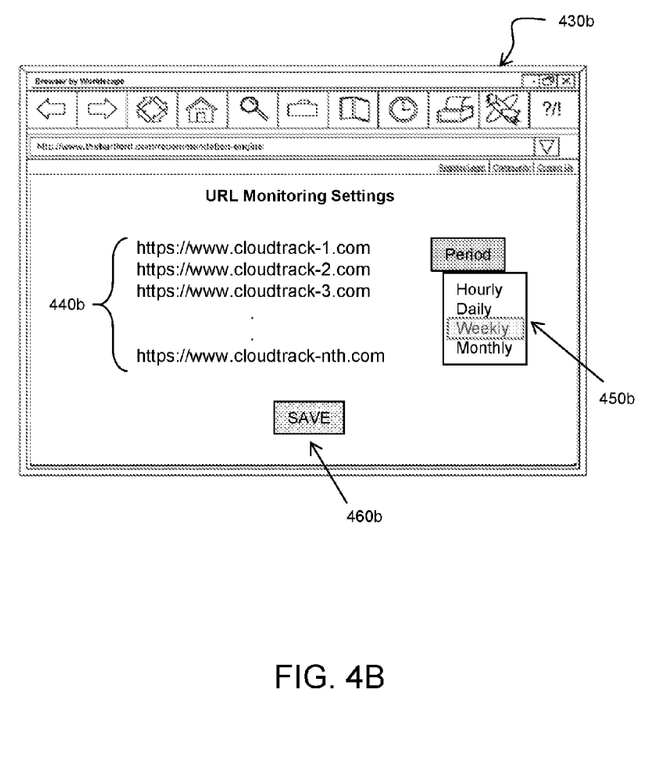

In FIG. 4B, within a settings sub-menu 430b of the web browser application, a user may configure the web browser extension to monitor various URLs 440b, here listed as URL 1, URL 2, . . . URL n. The web browser extension retrieves the listed URLs according to a timing policy, e.g., as indicated for example using a drop down menu 450b. The web browser extension will automatically retrieve the published versions of the websites according to the timing policy. The data that has been changed in the published data, e.g., Web_Site version 1-Δ-A-Web_Site version 2, may be automatically detected and stored for further analysis and processing. The configurations of the web browser extension may be saved by interfacing with a functional element 460*b* in the settings sub-menu 430*b*.

As has been described herein, additional or different data may be collected and stored as monitoring data, e.g., from one or more sources 160*a*, 160*b*. By way of example, a cloud service provider may be contacted directly to inquire as to the availability of a cloud-based service. As another example, a cloud-based service subscription may be maintained for the purpose of detecting its availability, e.g., periodically, intermittently, etc. Further, alternative data sources may be utilized, e.g., data regarding electrical power outages in geographic areas that contain hardware of a cloud service provider.

Figure 5:
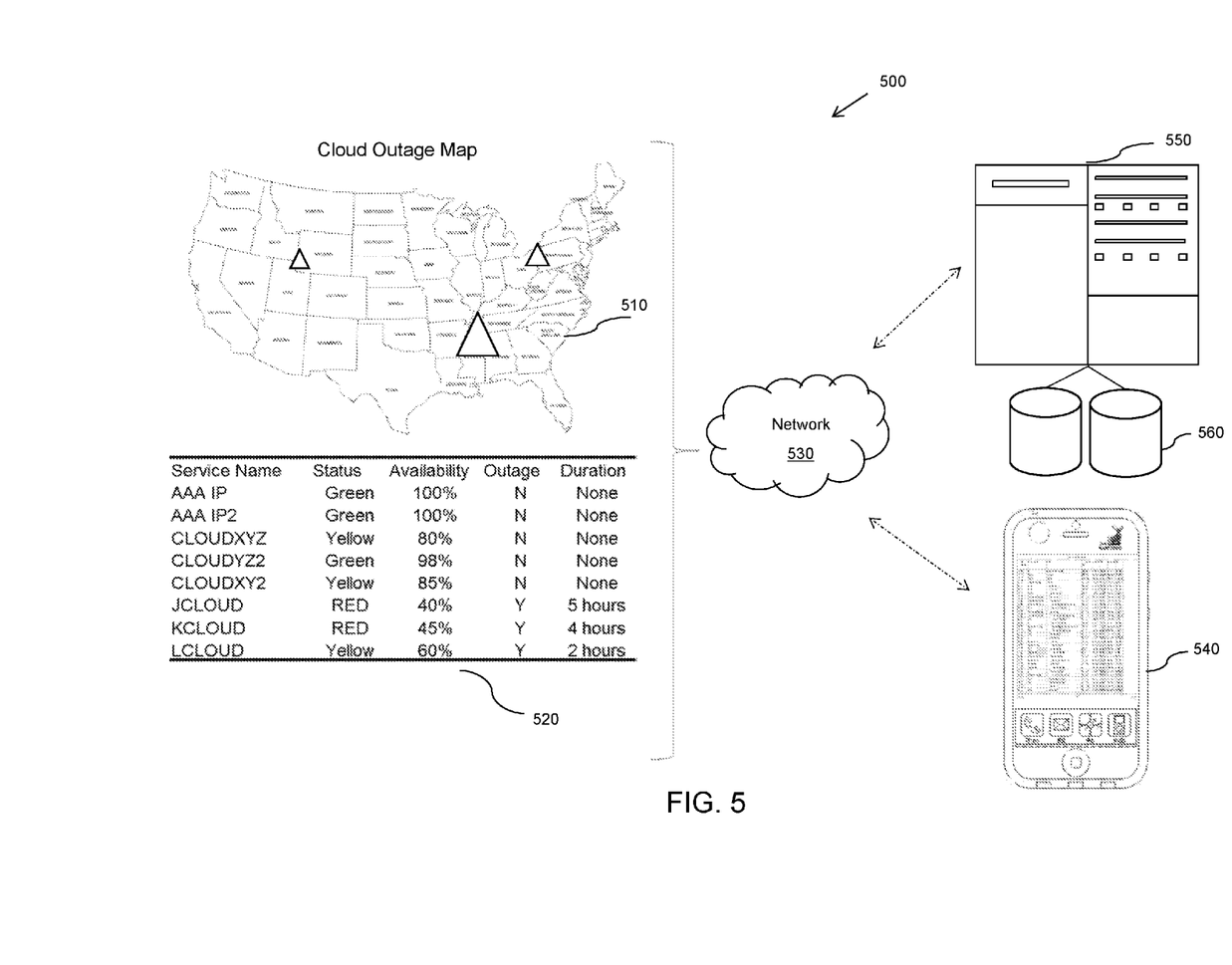
FIG. 5 illustrates an example system for monitoring data to detect cloud-based service outages.

As illustrated in FIG. 5, a system monitors cloud-based service data relevant to one or more cloud providers. A cloud outage map 510 indicates geographic areas associated with cloud-based service outages, e.g., areas in the cloud outage map 510 are geographically relevant to a cloud-based service(s) being monitored. Cloud-based service monitoring data 520 is collected for various cloud service providers and their respective cloud-based services. For example, cloud-based monitoring data 520 may include a service name or identifier, e.g., AAA IP or CLOUDXYZ, a characteristic, such as a status indicator, e.g., green, yellow or red, an availability indicator, e.g., 100% or 45%, a duration indicator, e.g., 5 hours, 4 hours or 2 hours, as illustrated.

Therefore, an embodiment may access the cloud-based service monitoring data 520, e.g., over a network 530 such as the Internet, and make the cloud-based service monitoring data 520 available to various device, e.g., a mobile client device 530, a mainframe computer 550, and/or store the cloud-based service monitoring data 520 in one or more databases 560. Providing the cloud-based service monitoring data 520 to devices 530 and/or 550 may be done after or in connection with data formatting and indexing techniques, as further described herein.

Having monitoring data, e.g., a change set in published web data from one or more URLs that are obtained by monitoring various third party sources using a web browser extension or like automated retrieval program, this monitoring data is automatically processed according to a rule set to assist in identifying the occurrence of an outage in cloud-based service(s).

Figure 6:
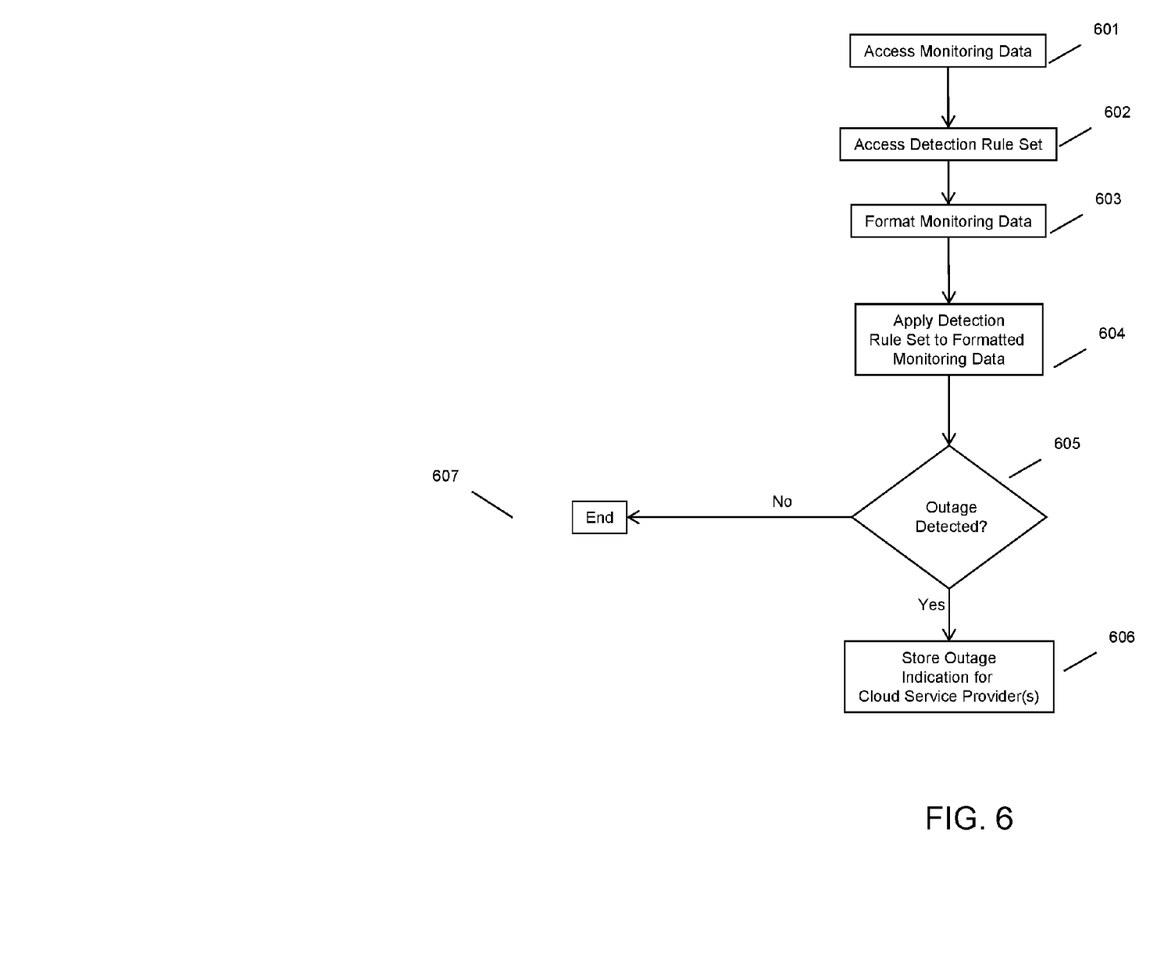
FIG. 6 illustrates an example method of processing cloud-based service monitoring data to detect an outage.

By way of example, and illustrated in FIG. 6, an embodiment accesses the monitoring data at 601. As described herein, this monitoring data may comprise an entire web page or may comprise a change set (data that has changed between versions of a web page), or other data, e.g., from a reporting service that monitors cloud outage data, e.g., as illustrated by the system in FIG. 5.

In the case of change set data, an embodiment accesses a detection rule set at 602, i.e., a monitoring program retrieves and executes a code module that loads one or more detection rules for analyzing the change set data. The monitoring data may be formatted prior to analysis continuing, e.g., using the detection rule set, as indicated at 603. By way of example, the website data may be formatted into a change set comprising text data derived from the web site data as an initial step in implementing the detection rule set. Furthermore, the change set may be reduced to a sub-set of data, e.g., using one or more key words or terms to identify relevant data with respect to detecting an outage.

Having accessed the monitoring data and the detection rule set, an embodiment applies the detection rule set to (formatted) monitoring data, e.g., a change set, at 604. This may include, for example, searching the change set data to identify predetermined data indicative of a cloud-based service outage, an identifier associated with a cloud service provider, and/or a characteristic of the cloud-based service outage. In one embodiment, for example, a change set may be searched for keywords such as "outage," "interruption," "cloud service provider A," etc., as well as timing data. This data may be used to determine, at 605, if an outage in a cloud-based service has occurred and what its duration or characteristic is.

If an outage is detected at 605, an association between the outage and a particular cloud service provider and/or cloud-based service may be stored, as indicated at 606. Otherwise, the process may end as indicated at 607.

Figure 7:
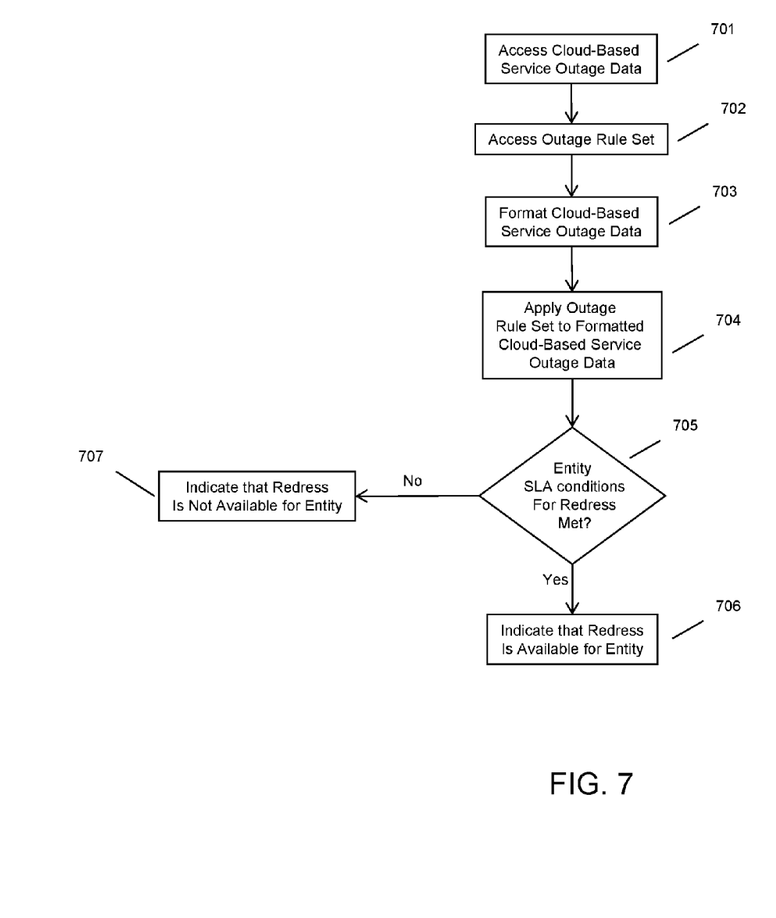
FIG. 7 illustrates an example of processing outage data to determine if redress is available for an entity due to a cloud-based service outage.

Having stored an association between a particular cloud service provider and/or cloud-based service, an embodiment may thereafter determine that an entity has a redress offering on the basis of the outage, as illustrated in FIG. 7.

By way of example, an embodiment may access the cloud-based service outage data at 701. This cloud-based service outage data may include, but is not limited to, an identification of an outage for a particular cloud-based service offered by a particular cloud service provider, for a particular duration, e.g., over 12 hours in duration.

An embodiment may access an outage rule set at 702, i.e., programmed logic that dictates whether redress should be offered for a particular entity. The outage rule set retrieved or accessed at 702 may include agreement data of an entity, e.g., a predetermined characteristic or set of characteristics of a cloud-based service outage, such as loss of service for at least 12 hours, which permits the entity to access a redress offering, which may be agreed to ahead of time.

As has been described herein, various data formatting may be implemented, as indicated at 703. By way of example, the cloud-based service outage data may have a timing parameter formatted to normalize it to terms of agreement data, e.g., changing hours to minutes, standardizing the time zone associated with the outage and the entity, etc.

An embodiment may therefore apply the outage rule set to formatted cloud-based service outage data at 704. This includes for example applying a rule that returns a true/false indication for the presence of a particular outage characteristic included in the cloud-based service outage data. By way of specific example, an embodiment may apply a rule set at 704 that returns a true indicator in response to detection of the following data elements: 1) a particular cloud service provider; 2) a particular cloud-based service of that provider; 3) an outage indicator (e.g., "interrupt," "outage," other keyword, etc.); 4) a time duration for the outage; and 5) an agreement data parameter indicating that the time duration for the outage has been exceeded.

If the entity's agreement data requirements for redress have been met, as indicated at 705, an embodiment provides an indication that redress is available for the entity at 706. Otherwise, an indication that redress is not available for the entity is provided at 707. The indication(s) may be automatically communicated to the entity in question, e.g., in the form of an electronic communication to the entity's contact email. If redress is available, a link may be included in the indication for retrieving the redress or for retrieving additional information about obtaining the redress, e.g., a link to a fillable form for claiming the redress on the basis of the outage.

The indication(s) may be automatically displayed, e.g., on display screen, for a user to review in determining if an outage has occurred and an entity is entitled to redress for the outage in question. This may materially reduce the time necessary for identifying an outage, verifying the outage, characterizing the outage, and identifying entities that may be qualified to request or receive redress in the event of the outage. As such, an embodiment may quickly apprise a reviewing user as to which outages may qualify for redress, which characteristics remain in question (and need to be verified) prior to offering redress, and which redress services or types may be offered to various entities.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system for cloud-based service outage detection and verification, comprising:
   a network link that receives, over a data communications network, cloud service provider outage information according to a predetermined retrieval policy;
   a processor that generates, using text data derived from the cloud service provider outage information, outage data comprising a third party cloud service provider identification and an outage characteristic; and
   a database that stores the outage data indexed according to cloud service provider identification and outage characteristic;
   the processor receiving, over the data communications network, data of a requesting entity;
   the processor thereafter identifying that the requesting entity subscribes to a cloud-based service of the third party cloud service provider based on a query using the database; and
   in response to the processor determining that the requesting entity subscribes to a cloud-based service of the third party cloud service provider, confirming that the-cloud based service has experienced an outage based on the outage data stored in the database and providing a verification indication to the requesting entity;
   wherein the receiving of cloud service provider outage information according to a predetermined retrieval policy comprises monitoring web site content for new content; wherein the generating outage data comprises extracting the new content once identified and associating the new content with an outage of the third party cloud service provider, and further wherein the confirming that the cloud-base service has experienced an outage is based at least in part on the new content.

2. The system of claim 1, wherein the providing progresses without confirming a cause for the outage.

3. The system of claim 1, wherein monitoring of web site content is implemented by a web browser application extension.

4. The system of claim 1, wherein the web site content comprises a plurality of web pages maintained by the third party cloud service provider.

5. The system of claim 1, wherein the web site content comprises a plurality of web pages maintained by other parties.

6. The system of claim 1, wherein the providing proceeds automatically.

7. The system of claim 1, wherein the verification comprises a notification that redress is available.

8. The system of claim 7, wherein the notification comprises a link to the redress offered.

9. A method for cloud-based service outage detection and verification, comprising:

receiving, over a data communications network, cloud service provider outage information according to a predetermined retrieval policy;

generating, using a processor that extracts text data derived from the cloud service provider outage information, outage data comprising a third party cloud service provider identification and an outage characteristic;

storing, in a database, the outage data indexed according to cloud service provider identification and outage characteristic;

receiving, over the data communications network, data of a requesting entity;

thereafter identifying, using the processor, that the requesting entity subscribes to a cloud-based service of the third party cloud service provider based on a query using the database; and in response to the processor determining that the requesting entity subscribes to a cloud-based service of the third party cloud service provider, confirming that the-cloud based service has experienced an outage based on the outage data stored in the database and providing a verification indication to the requesting entity;

wherein the receiving of cloud service provider outage information according to a predetermined retrieval policy comprises monitoring web site content for new content; wherein the generating outage data comprises extracting the new content once identified and associating the new content with an outage of the third party cloud service provider, and further wherein the confirming that the cloud-base service has experienced an outage is based at least in part on the new content.

10. The method of claim 9, wherein the providing progresses without confirming a cause for the outage.

11. The method of claim 9, wherein monitoring of web site content is implemented by a web browser application extension.

12. The method of claim 9, wherein the web site content comprises a plurality of web pages maintained by the third party cloud service provider.

13. The method of claim 9, wherein the web site content comprises a plurality of web pages maintained by other parties.

14. The method of claim 11, wherein the providing proceeds automatically.

15. The method of claim 9, wherein the verification comprises a notification that redress is available.

16. The method of claim 15, wherein the notification comprises a link to the redress offered.

17. The method of claim 9, wherein the verification comprises a notification that redress is not available.

18. A system for cloud-based service outage detection and verification, comprising:

a database that stores third party cloud service outage information;

a system memory; and a processor that is operatively coupled to the database and the system memory;

the processor being configured to receive data of a requesting entity, to identify the requesting entity based on a database query using the data of the requesting entity, and to determine that the requesting entity is associated with an agreement for a cloud-base service of a third party;

the processor being configured to execute a program of instructions to:
automatically collect data from a plurality of predetermined sources;
store the data in the database; and
confirm that the cloud-based service has experienced an outage based on data stored in the database;

the system further:
evaluates, using the data stored in the database, that the outage meets at least one predetermined time limit specified in the agreement; and
in response to the at least one predetermined threshold being met, provides a redress indication to the requesting entity.

* * * * *